(12) United States Patent
Tal (10) Patent No.: US 10,747,528 B2
(45) Date of Patent: Aug. 18, 2020

(54) MODIFICATION OF SOFTWARE APPLICATION CONTENT WITHIN A CLOUD-DEPLOYED APPLICATION CONTAINER

(71) Applicant: SAP PORTALS ISRAEL LTD., Ra'anana (IL)

(72) Inventor: Shimon Tal, Kefar Haornim (IL)

(73) Assignee: SAP Portals Israel Ltd., Ra'anana (IL)

( * ) Notice: Subject to any disclaimer, the term of this patent is extended or adjusted under 35 U.S.C. 154(b) by 0 days.

(21) Appl. No.: 16/124,623

(22) Filed: Sep. 7, 2018

(65) Prior Publication Data

US 2020/0081706 A1 Mar. 12, 2020

(51) Int. Cl.
*G06F 8/656* (2018.01)
*H04L 29/06* (2006.01)
*G06F 8/61* (2018.01)
*H04L 29/08* (2006.01)
*H04L 12/24* (2006.01)
*G06F 9/455* (2018.01)

(52) U.S. Cl.
CPC ............ *G06F 8/656* (2018.02); *H04L 63/166* (2013.01); *G06F 8/61* (2013.01); *G06F 9/455* (2013.01); *H04L 41/0813* (2013.01); *H04L 67/10* (2013.01)

(58) Field of Classification Search
CPC ... H04L 63/166; H04L 41/0813; H04L 67/10; H04L 67/125; H04L 67/26; H04L 67/34; G06F 8/61; G06F 9/44526; G06F 9/455
USPC ........................................................ 717/171
See application file for complete search history.

(56) References Cited

U.S. PATENT DOCUMENTS

| 9,830,307 | B1 * | 11/2017 | Willhoit | ................. H04L 67/34 |
| 9,935,828 | B2 | 4/2018 | Tal et al. | |
| 2014/0040343 | A1 * | 2/2014 | Nickolov et al. | ....... H04L 67/34 709/201 |
| 2018/0088926 | A1 * | 3/2018 | Abrams | ................. H04L 67/34 |

\* cited by examiner

*Primary Examiner* — Wei Y Zhen
*Assistant Examiner* — Mohammed N Huda
(74) *Attorney, Agent, or Firm* — Fish & Richardson P.C.

(57) ABSTRACT

A command is received in a cloud-computing environment from an integrated development environment (IDE), where the command is to update runtime software application content in an application container associated with the runtime software application content, and where the command contains new software application content. Without terminating the application container, a connection is opened to the application container using the application container name as an identifier, and at least some of the runtime software application content in the application container is modified using the new software application content.

20 Claims, 3 Drawing Sheets

MODIFICATION OF SOFTWARE APPLICATION CONTENT WITHIN A CLOUD-DEPLOYED APPLICATION CONTAINER

BACKGROUND

In cloud-computing environments, software applications are typically run in a managed way within an application container. Application management typically permits external communication with a software application using a communication port. In some cases only one communication port can be used and the communication port is reserved exclusively to application logic of a particular software application. Some software application communications, interactions, or activities may require access to a software application process and execution of the software application process in a manner that is not supported by current cloud-computing environment configurations. This restriction applies to all providers that execute software applications inside particular application containers.

SUMMARY

The present disclosure describes modification of software application content within a cloud-deployed application container.

In an implementation, a command is received in a cloud-computing environment from an integrated development environment (IDE), where the command is to update runtime software application content in an application container associated with the runtime software application content, and where the command contains new software application content. Without terminating the application container, a connection is opened to the application container using the application container name as an identifier, and at least some of the runtime software application content in the application container is modified using the new software application content.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described methodology permits (among others)) incremental/hot deployment or debugging activities in cloud-computing environments by permitting software application processes to be run in a manner not supported by current cloud-computing solutions. Second, the described methodology permits access and modification to a software application (such as, to application static content and reflection of the modifications) without stopping/restarting a deployed software application inside a particular application container or the particular application container after a modification action has been performed. A particular example can include modifications made to static content related to a user interface (UI) application during software development and the ability to quickly see the effect of the modifications on the UI. Third, the described subject matter allows for more efficient/less-expensive common development activities (such as, with respect to time, processor cycles, memory usage, and network bandwidth/congestion) or activities that would normally be impossible to perform.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes modification of software application content within a cloud-deployed application container, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In cloud-computing environments, software applications ("applications" or "apps") are typically run in a managed way within an application container. Application management typically permits external communication with an application using a communication port (for example, a Transmission Control Protocol (TCP) port). In some cases only one communication port can be used and the communication port is reserved exclusively to application logic of a particular software application.

Software development environments require a higher-level of instrumentation for development activities (such as, incremental/hot deployment or debugging (among others)). However, some software application communications, interactions, or activities may require access to a software application process and execution of the software application process in a manner that is not supported by current cloud-computing environment configurations (such as, CLOUD FOUNDRY or HEROKU). In these cloud-computing environments, required access is allowed only by stopping/restarting a deployed software application after a required action (such as, modifying software application static content) has been performed. The impact of this is that common development activities are either impossible or very expensive to perform due to the nature of re-deploying a static software application (mainly iterations with a user interface (UI) and reflection of the modifications to the software application static content). This restriction applies to all providers that execute software applications inside particular application containers and can negatively impact test, coding, and deployment (TCD). Typically TCD activities are not scalable. For example, during the development stage, a software developer needs to wait (for example, minutes) until a software application is re-deployed, to test new changes. Redeployment (killing and deploying a new software application) can consume a lot of computing resources (such as, processing cycles, memory usage, and network bandwidth). The described subject matter permits a reduction in TCD time (for example, to seconds) as it is not necessary to terminate/restart a running software application/application container in order to make modifications to software application content.

Figure 1:
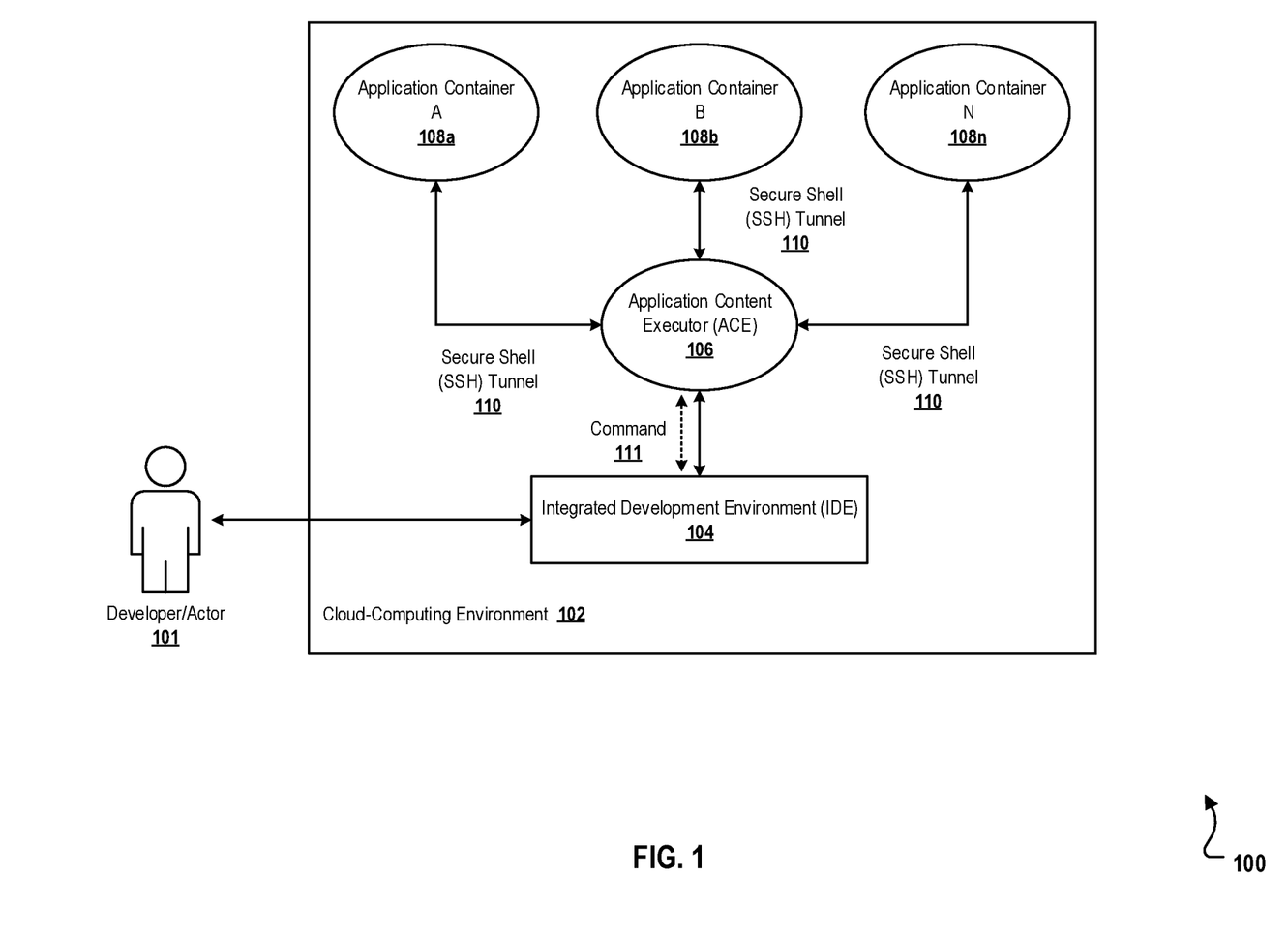
FIG. 1 is a block diagram illustrating a high-level example of a cloud-computing environment configuration used to modify software application content to a cloud-deployed application container, according to an implementation of the present disclosure.

At a high-level and in some implementations, a tunnel is opened up to an application container. The tunnel is used to change, at runtime, software application content. Software application content can include any type of static or dynamic data (such as, files, images, records, and data structures) associated with a software application. In some implementations, and as illustrated in FIG. 1, the tunnel can be a secure shell (SSH) tunnel. In some implementations, SSH file transfer protocol (SFTP) can be used to make changes to the software application content in the application container. The ability to change the software application content at runtime supports incremental/hot deployment in cloud-computing environments. Since the described subject matter is concerned with software development scenarios/operations, a software developer can change software application content at runtime in a manner similar to changes normally made by the developer at design-time.

FIG. 1 is a block diagram illustrating a high-level example of a cloud-computing environment configuration 100 used to modify software application content to a cloud-deployed application container, according to an implementation of the present disclosure. In some implementations, described elements of the cloud-computing environment configuration 100 can be execute on actual hardware, virtual machines executing on actual hardware or a combination of actual and virtual machines. As illustrated, FIG. 1 includes a Developer (Actor) 101, Cloud-Computing Environment 102, an Integrated Development Environment (IDE) 104, an Application Content Executor (ACE) 106, Application Containers 108a-108n (representing software applications A, B, . . . , and N), and SSH Tunnels 110 between the ACE 106 and Application Containers 108a-n. In some implementations, SFTP is used with the SSH Tunnels 110. Commands 111 are dispatched by the IDE 104 and executed on the ACE 106.

The IDE 104 is a software application (for example, WEBIDE) that provides comprehensive tools to computer programmers for software development. The IDE 104 normally consists of a source code editor, software build tools, and a debugger. Some IDEs 102 include many automated processes and intelligent code completion. A Developer 101 can use the IDE 104 to modify software application code and to run the modified software application code. The IDE 104 is typically situated within the Cloud-Computing Environment 102. In some implementations, the IDE 104 can be situated externally to the Cloud-Computing Environment 102. One or more IDE 104 can be executed within or external to the Cloud-Computing Environment 102.

The Cloud-Computing Environment 102 can be a cloud-computing platform that is commercially available (such as, CLOUD FOUNDRY or HEROKU), proprietary, or a combination of a commercial and proprietary platform. Any cloud-computing environment consistent with the disclosure is considered to be within the scope of the disclosure.

The Developer 101 can work with the IDE 104 using a graphical-type user interface (UI) (or GUI) or other UI. For example, the Developer 101 can interface with the IDE 104 within one or more Internet/Web browser-type windows. In this scenario, if the Developer 101 makes a modification to software application content, a refresh of the browser can reflect the modification in the browser.

The ACE 106 is an additional software application deployed to a new application container in the Cloud-Computing Environment 102. When a Developer 101 modifies software application content, a request/command is initiated from the IDE 104 to the ACE 106. In some implementations, the request is to update runtime software application content in a particular application container (for example, Application Container 108a) and the request contains the new application content. In some implementations, the described subject matter can support, among others, HTML/CSS, PHP, Ruby, and Perl.

In some implementations, the ACE 106 can initiated on the execution of the IDE 104 or at another point in the development process. The ACE 106 is considered to be stateless so it can be used with one or more software applications/Application Containers 108a-n. A connection from the ACE 106 to an Application Container 108a-n is opened as-needed. One or more ACE 106 can be executed in the Cloud-Computing Environment 102 (for example, each ACE 106 can be dedicated to a particular IDE 104 or Application Container 108a-n).

The ACE 106 can receive/indicate errors with respect to the IDE 106. For example, if an SSH Tunnel 110 cannot be opened with a particular Application Container 108a-n or if a file transfer from the ACE 106 to the particular Application Container 108a-n fails, one or more errors can be reflected in the IDE 104 for Developer 101 analysis.

Without terminating a particular application container (for example, Application Container 108a), the ACE 106 connects to the particular application container containing runtime software application content to be modified. In some implementations, the connection to the particular application container is an SSH Tunnel 110. The ACE 106 modifies at least some of the runtime software application content in the particular application container (for example, library files, data structures, or files). In some implementations, the ACE 106 uses SFTP to perform the modification to the runtime software application content.

Following the modification of the runtime software application content, the new application content is available at runtime for Developer 101 review. For example, in an implementation, if the Developer 101 wishes to modify static content associated with a UI, once the runtime software application content has been modified with the new application content, the Developer 101 can refresh a browser displaying the UI software application to see the new application content in the browser.

Figure 2:
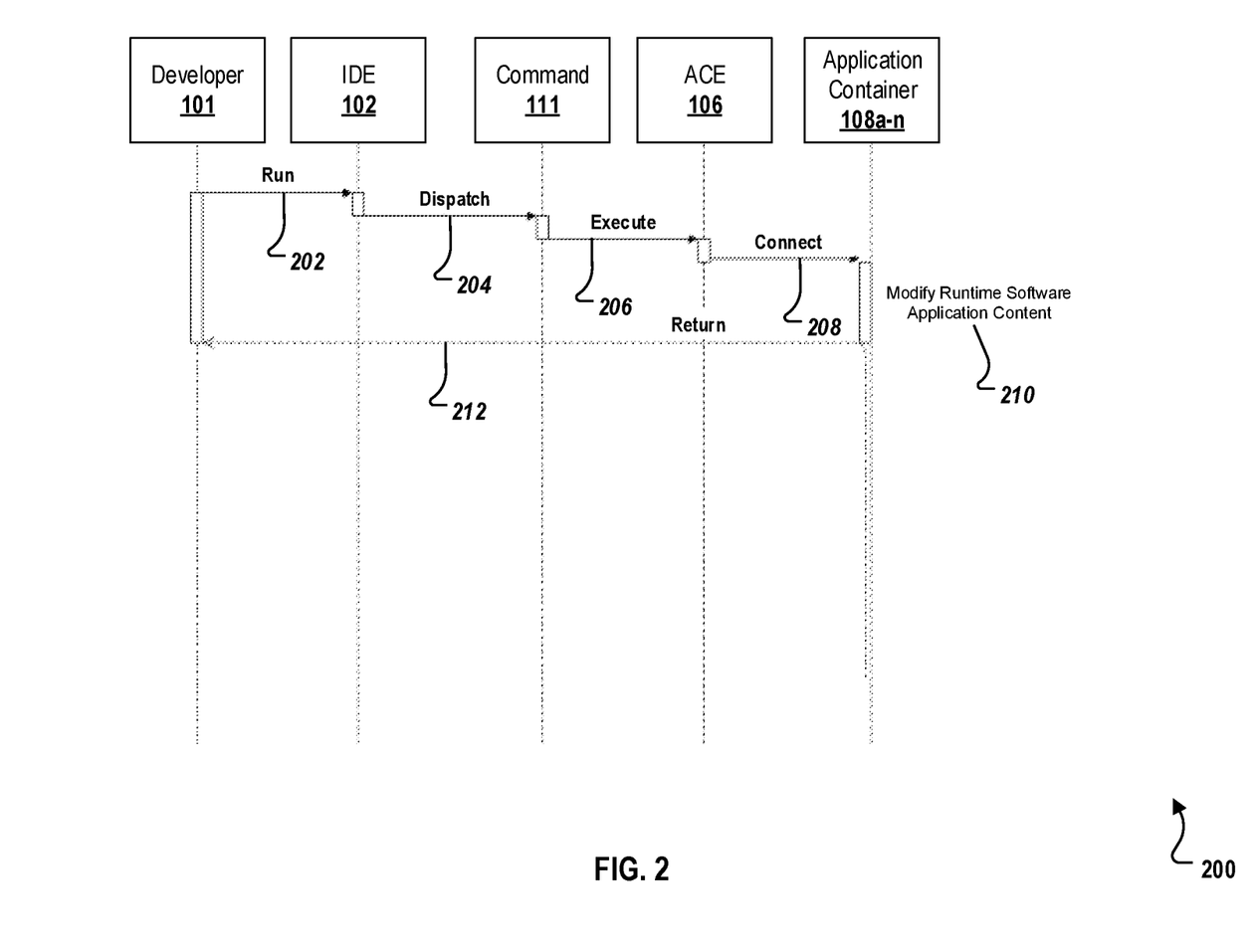
FIG. 2 is a swim diagram illustrating an example of a method for modifying software application content to a cloud-deployed application container in a cloud-computing environment, according to an implementation of the present disclosure.

FIG. 2 is a swim diagram illustrating an example of a method for modifying software application content to a cloud-deployed application container in a cloud-computing environment, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a Developer 101 runs the IDE 104 to perform software development actions. For example, the Developer 101 modifies runtime software application content in the IDE 104. From 202, method 200 proceeds to 204.

At 204, the IDE 104 dispatches a Command 111 to execute on an ACE 106 that is deployed in a cloud computing environment and in another application container separate from the Application Container 108a-n. For example, a Developer 101 can select a button on a UI to indicate a desire to visualize a result of the modified runtime software application content. The button selection initiates a Command 111 that is dispatched to be executed on the ACE 106. From 204, method 200 proceeds to 206.

At 206, the ACE 106 receives the Command 111 transmitted from the IDE 104 to update runtime software application content in an Application Container 108a-n associated with the runtime software application content and deployed in the cloud-computing environment where the ACE 106 is deployed. The Command 111 contains new software application content and is executed on the ACE 106. From 206, method 200 proceeds to 208.

At 208, without terminating the Application Container 108a-n, the ACE 106 connects to the Application Container 108a-n executing a deployed software application. In some implementations, the connection is a secure shell (SSH) Tunnel 110 between the ACE 106 and the Application Container 108a-n. In some implementations, the connection to the Application Container 108a-n is opened using an application container name as an identifier (for example, in a manifest-type file). From 208, method 200 proceeds to 210.

At 210, at least some of the runtime software application content in the Application Container 108a-n is modified using the new software application content. In some implementations, the runtime software application content is changed in the Application Container 108a-n by the ACE 106 using SFTP. From 212, method 200 proceeds to 212.

At 212, the changed runtime software application content can be visualized by the Developer 101 (for example, in a browser window). After 212, method 200 stops.

Figure 3:
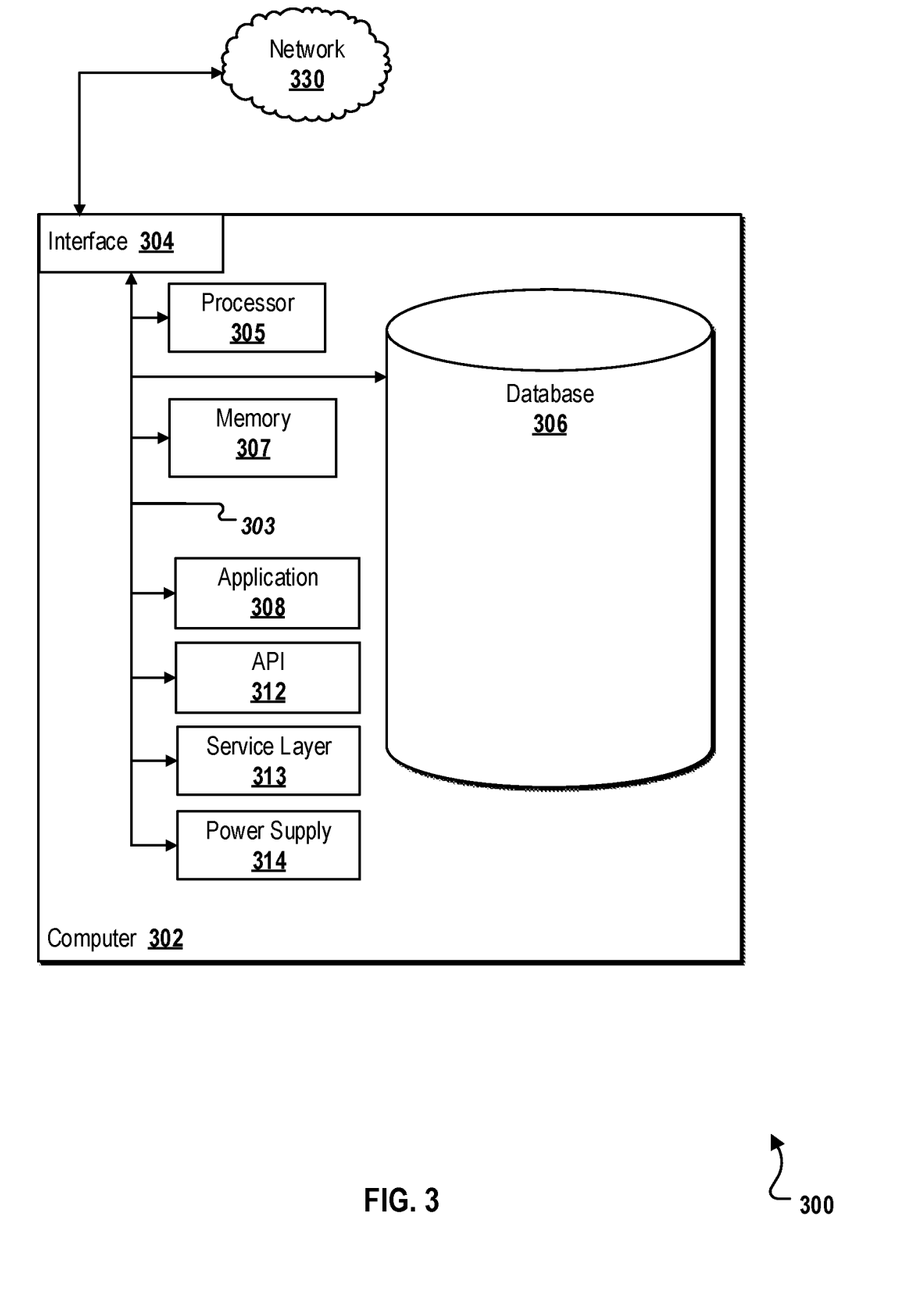
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on GUI or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: receiving, in a cloud-computing environment, a command from an integrated development environment (IDE) to update runtime software application content in an application container associated with the runtime software application content, wherein the command contains new software application content; and without terminating the application container: opening a connection to the application container using the application container name as an identifier; and modifying at least some of the runtime software application content in the application container using the new software application content.

The foregoing and other described implementations can each, optionally, include one or more of the following features:

A first feature, combinable with any of the following features, further comprising deploying the application container in the cloud-computing environment.

A second feature, combinable with any of the previous or following features, wherein the connection is a secure shell (SSH) tunnel.

A third feature, combinable with any of the previous or following features, wherein the application content is changed in the application container using secure shell (SSH) file transfer protocol (SFTP).

A fourth feature, combinable with any of the previous or following features, further comprising deploying an Application Content Executor (ACE) in the cloud-computing environment and in another container separate from the application container.

A fifth feature, combinable with any of the previous or following features, further comprising: modifying runtime software application content in the IDE; receiving an indication of a desire to visualize the result of the modified runtime software application content; and transmitting, to the ACE, a command to update the runtime software application content in the application container.

A sixth feature, combinable with any of the previous or following features, wherein the ACE is used in incremental deployment or incremental debugging.

In a second implementation, a non-transitory, computer-readable medium storing one or more instructions executable by a computer system to perform operations comprising: receiving, in a cloud-computing environment, a command from an integrated development environment (IDE) to update runtime software application content in an application container associated with the runtime software application content, wherein the command contains new software application content; and without terminating the application container: opening a connection to the application container using the application container name as an identifier; and modifying at least some of the runtime software application content in the application container using the new software application content.

The foregoing and other described implementations can each, optionally, include one or more of the following features:

A first feature, combinable with any of the following features, further comprising one or more instructions to deploy the application container in the cloud-computing environment.

A second feature, combinable with any of the previous or following features, wherein the connection is a secure shell (SSH) tunnel.

A third feature, combinable with any of the previous or following features, wherein the application content is changed in the application container using secure shell (SSH) file transfer protocol (SFTP).

A fourth feature, combinable with any of the previous or following features, further comprising one or more instructions to deploy an Application Content Executor (ACE) in the cloud-computing environment and in another container separate from the application container.

A fifth feature, combinable with any of the previous or following features, further comprising one or more instructions to: modify runtime software application content in the IDE; receive an indication of a desire to visualize the result of the modified runtime software application content; and transmit, to the ACE, a command to update the runtime software application content in the application container.

A sixth feature, combinable with any of the previous or following features, wherein the ACE is used in incremental deployment or incremental debugging.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, in a cloud-computing environment, a command from an integrated development environment (IDE) to update runtime software application content in an application container associated with the runtime software application content, wherein the command contains new software application content; and without terminating the application container: opening a connection to the application container using the application container name as an identifier; and modifying at least some of the runtime software application content in the application container using the new software application content.

The foregoing and other described implementations can each, optionally, include one or more of the following features:

A first feature, combinable with any of the following features, further comprising one or more operations to deploy the application container in the cloud-computing environment.

A second feature, combinable with any of the previous or following features, wherein the connection is a secure shell (SSH) tunnel.

A third feature, combinable with any of the previous or following features, wherein the application content is changed in the application container using secure shell (SSH) file transfer protocol (SFTP).

A fourth feature, combinable with any of the previous or following features, further comprising one or more operations to deploy an Application Content Executor (ACE) in the cloud-computing environment and in another container separate from the application container.

A fifth feature, combinable with any of the previous or following features, further comprising one or more operations to: modify runtime software application content in the IDE; receive an indication of a desire to visualize the result of the modified runtime software application content; and transmit, to the ACE, a command to update the runtime software application content in the application container.

A sixth feature, combinable with any of the previous or following features, wherein the ACE is used in incremental deployment or incremental debugging.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for modifying a software application content during runtime, the method being executed using one or more processors and comprising:
   receiving, in a cloud-computing environment, a command from an integrated development environment (IDE) to update runtime software application content in an application container associated with the runtime software application content, wherein the command contains new software application content; and
   without terminating the application container:
      opening a connection between an application content executor (ACE) and the application container using an application container name as an identifier, the connection enabling the ACE to perform a modification to the runtime software application content during runtime;
      modifying at least some of the runtime software application content in the application container using the new software application content during runtime; and
      refreshing a browser displaying the software application content to display the new software application content.

2. The computer-implemented method of claim 1, further comprising deploying the application container in the cloud-computing environment.

3. The computer-implemented method of claim 1, wherein the connection is a secure shell (SSH) tunnel.

4. The computer-implemented method of claim 1, wherein the application content is changed in the application container using secure shell (SSH) file transfer protocol (SFTP).

5. The computer-implemented method of claim 1, further comprising deploying the ACE in the cloud-computing environment and in another container separate from the application container.

6. The computer-implemented method of claim 5, further comprising:
modifying runtime software application content in the IDE;
receiving an indication of a desire to visualize a result of the modified runtime software application content; and
transmitting, to the ACE, a command to update the runtime software application content in the application container.

7. The computer-implemented method of claim 5, wherein the ACE is used in incremental deployment or incremental debugging.

8. A non-transitory, computer-readable medium storing one or more instructions executable by a computer system to perform operations comprising:
receiving, in a cloud-computing environment, a command from an integrated development environment (IDE) to update runtime software application content in an application container associated with the runtime software application content, wherein the command contains new software application content; and
without terminating the application container:
opening a connection between an application content executor (ACE) and the application container using an application container name as an identifier, the connection enabling the ACE to perform a modification to the runtime software application content during runtime;
modifying at least some of the runtime software application content in the application container using the new software application content during runtime; and
refreshing a browser displaying the software application content to display the new software application content.

9. The non-transitory, computer-readable medium of claim 8, further comprising one or more instructions to deploy the application container in the cloud-computing environment.

10. The non-transitory, computer-readable medium of claim 8, wherein the connection is a secure shell (SSH) tunnel.

11. The non-transitory, computer-readable medium of claim 8, wherein the application content is changed in the application container using secure shell (SSH) file transfer protocol (SFTP).

12. The non-transitory, computer-readable medium of claim 8, further comprising one or more instructions to deploy the ACE in the cloud-computing environment and in another container separate from the application container.

13. The non-transitory, computer-readable medium of claim 12, further comprising one or more instructions to:
modify runtime software application content in the IDE;
receive an indication of a desire to visualize a result of the modified runtime software application content; and
transmit, to the ACE, a command to update the runtime software application content in the application container.

14. The non-transitory, computer-readable medium of claim 12, wherein the ACE is used in incremental deployment or incremental debugging.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, in a cloud-computing environment, a command from an integrated development environment (IDE) to update runtime software application content in an application container associated with the runtime software application content, wherein the command contains new software application content; and
without terminating the application container:
opening a connection between an application content executor (ACE) and the application container using an application container name as an identifier, the connection enabling the ACE to perform a modification to the runtime software application content during runtime;
modifying at least some of the runtime software application content in the application container using the new software application content during runtime; and
refreshing a browser displaying the software application content to display the new software application content.

16. The computer-implemented system of claim 15, further comprising one or more operations to deploy the application container in the cloud-computing environment.

17. The computer-implemented system of claim 15, wherein the connection is a secure shell (SSH) tunnel.

18. The computer-implemented system of claim 15, wherein the application content is changed in the application container using secure shell (SSH) file transfer protocol (SFTP).

19. The computer-implemented system of claim 15, further comprising one or more operations to deploy the ACE in the cloud-computing environment and in another container separate from the application container.

20. The computer-implemented system of claim 19, further comprising one or more operations to:
modify runtime software application content in the IDE;
receive an indication of a desire to visualize a result of the modified runtime software application content; and
transmit, to the ACE, a command to update the runtime software application content in the application container.

* * * * *